United States Patent
Yang et al.

(10) Patent No.: US 11,181,432 B2
(45) Date of Patent: Nov. 23, 2021

(54) DIFFERENTIAL PRESSURE MEASUREMENT ARRANGEMENT AND METHOD FOR IDENTIFYING BLOCKED DIFFERENTIAL PRESSURE LINES

(71) Applicant: Endress+Hauser SE+Co. KG, Maulburg (DE)

(72) Inventors: Long Yang, Schopfheim (DE); Max Jehle, Wehr (DE); Davide Parrotto, Weil am Rhein (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 356 days.

(21) Appl. No.: 16/323,967

(22) PCT Filed: Jul. 14, 2017

(86) PCT No.: PCT/EP2017/067824
§ 371 (c)(1),
(2) Date: Apr. 22, 2019

(87) PCT Pub. No.: WO2018/028931
PCT Pub. Date: Feb. 15, 2018

(65) Prior Publication Data
US 2019/0242773 A1 Aug. 8, 2019

(51) Int. Cl.
*G01L 27/00* (2006.01)
*G01F 1/36* (2006.01)
(Continued)

(52) U.S. Cl.
CPC .............. *G01L 27/007* (2013.01); *G01F 1/34* (2013.01); *G01F 1/363* (2013.01);
(Continued)

(58) Field of Classification Search
CPC ......... G01L 27/007; G01L 13/00; G01F 1/34; G05B 2219/24033
See application file for complete search history.

(56) References Cited

U.S. PATENT DOCUMENTS

| | | | |
|---|---|---|---|
| 5,680,109 A | 10/1997 | Lowe et al. | |
| 6,119,047 A * | 9/2000 | Eryurek | G05B 13/0275 700/240 |

(Continued)

FOREIGN PATENT DOCUMENTS

| | | |
|---|---|---|
| CN | 1185841 A | 6/1998 |
| CN | 1514928 A | 7/2004 |

(Continued)

OTHER PUBLICATIONS

Search Report for German Patent Application No. 10 2016 114 846.6, German Patent Office, dated Nov. 15, 2016, 6 pp.

(Continued)

*Primary Examiner* — Eric S. McCall
*Assistant Examiner* — Timothy P Graves
(74) *Attorney, Agent, or Firm* — Christopher R. Powers; Endress+Hauser (USA) Holding Inc.

(57) ABSTRACT

A method for diagnosing a differential pressure line of a differential pressure measurement arrangement includes capturing a first set number of differential pressure values, which represent a difference between a first media pressure and a second media pressure within a process, and checking whether the differential pressure measurement arrangement and/or the process are in a state that allows a diagnosis of the differential pressure line. Where it is determined that the differential pressure measurement arrangement and/or the process are not in a state that allows a diagnosis of the differential pressure line, the differential pressure values are captured anew such that the previously captured differential pressure values are deleted or overwritten. Otherwise, a (Continued)

diagnostic function to determine whether a differential pressure line is blocked is carried out.

16 Claims, 2 Drawing Sheets

(51) Int. Cl.
*G01L 13/00* (2006.01)
*G01F 1/34* (2006.01)
*G01L 13/02* (2006.01)
*G01F 25/00* (2006.01)
*G01L 19/00* (2006.01)

(52) U.S. Cl.
CPC .......... *G01F 25/0007* (2013.01); *G01L 13/00* (2013.01); *G01L 13/025* (2013.01); *G01L 19/0007* (2013.01); *G01L 19/0023* (2013.01); *G05B 2219/24033* (2013.01)

(56) References Cited

U.S. PATENT DOCUMENTS

| | | | |
|---|---|---|---|
| 6,532,392 | B1 | 3/2003 | Eryurek et al. |
| 6,654,697 | B1 | 11/2003 | Eryurek et al. |
| 2002/0029130 | A1* | 3/2002 | Eryurek ............. G05B 13/0275 702/183 |
| 2014/0025318 | A1* | 1/2014 | Satou .................... G01L 27/007 702/50 |
| 2016/0054162 | A1 | 2/2016 | Hollaender et al. |

FOREIGN PATENT DOCUMENTS

| | | |
|---|---|---|
| CN | 101120238 A | 2/2008 |
| CN | 101334330 A | 12/2008 |
| CN | 102989074 A | 3/2013 |
| CN | 103575466 A | 2/2014 |
| CN | 203688005 U | 7/2014 |
| CN | 105378451 A | 3/2016 |
| DE | 102004058424 A1 | 6/2006 |
| DE | 102006004582 A1 | 8/2007 |
| JP | 2007292733 A | 11/2007 |

OTHER PUBLICATIONS

International Search Report for Patent Application No. PCT/EP2017/067824, WIPO, dated Oct. 9, 2017, 15 pp.

Liguo Gao, et al, Energy-dispersive X-ray fluorescence method, Chengdu University of Science and Technology Press, Apr. 1998, pp. 187-190. (Concise Explanation of Relevance provided).

* cited by examiner

DIFFERENTIAL PRESSURE MEASUREMENT ARRANGEMENT AND METHOD FOR IDENTIFYING BLOCKED DIFFERENTIAL PRESSURE LINES

CROSS-REFERENCE TO RELATED APPLICATIONS

The present application is related to and claims the priority benefit of German Patent Application No. 10 2016 114 846.6, filed on Aug. 10, 2016 and International Patent Application No. PCT/EP2017/067824, filed on Jul. 14, 2017 the entire contents of which are incorporated herein by reference.

TECHNICAL FIELD

The present invention relates to a differential pressure measurement arrangement having differential pressure lines and to a method for detecting blocked differential pressure lines.

BACKGROUND

Differential pressure measurement arrangements having differential pressure lines are especially used for flow measurement or filter monitoring, wherein, in the direction of flow, two differential pressure lines, one above and one below a differential pressure sensor, such as an orifice or a Venturi nozzle, or a filter, are connected to a media-carrying line in order to transfer the differential pressure to a differential pressure transducer of the differential pressure measurement arrangement via the medium. Operation of these measurement arrangements may lead to blockage of the differential pressure lines, thus negatively influencing reliable measurement. Therefore, measures for detecting the blockage of differential pressure lines at an early stage are known.

German patent application DE 10 2013 110 059 A1 describes a differential pressure measurement arrangement and a method which make it possible to detect and identify a blocked differential pressure line. To this end, the patent application proposes a processing unit designed to determine a correlation between a change in the temperature signal and the differential pressure measurement signal on the basis of the differential pressure measurement signal and the temperature signal, and to evaluate the found correlation as an indication of a blocked differential pressure line.

However, it has been found that the approach described in DE 10 2013 110 059 A1 has weaknesses with regard to the significance of the differential pressure line to be determined when the differential pressure measurement arrangement and/or process is or are in a state unsuitable for determining a blocked differential pressure line.

SUMMARY

It is therefore the aim of the invention to propose a differential pressure measurement arrangement and a method which allow increased reliability with respect to determining a blocked differential pressure line. The aim is achieved according to the invention by the differential pressure measurement arrangement according to claim 1 and the method according to claim 4.

The differential pressure measurement arrangement according to the invention comprises:

- a differential pressure transducer for determining at least one differential pressure value representing a difference between a first media pressure and a second media pressure within a process;
- a first differential pressure line, which is connected to a first pressure inlet of the differential pressure transducer in order to apply the first media pressure to the differential pressure transducer;
- a second differential pressure line, which is connected to a second pressure inlet of the differential pressure transducer in order to apply the second media pressure to the differential pressure transducer;
- a diagnostics unit designed to carry out the following method steps:
  a) capturing a set number of first differential pressure values;
  b) checking whether the differential pressure measurement arrangement and/or the process are in a state which allows a diagnosis of the differential pressure line;
  c) returning to method step a) in the case where it is determined that the differential pressure measurement arrangement and/or the process are not in a state which allows a diagnosis of the differential pressure line, wherein, in method step a), the first differential pressure values are captured anew such that the previously captured first differential pressure values are deleted or overwritten;
  d) carrying out a diagnostic function to determine whether a differential pressure line is blocked in the case where it is determined that the differential pressure measurement arrangement and/or the process are in a state which allows a diagnosis of the differential pressure line.

In principle, the invention is based upon the assumption that a process is always subject to noise, which is unique, but substantially constant for each process, when the process is in a defined state, and that the process may also have interference signals due to interfering influences that go beyond normal noise. In addition, the differential pressure measurement arrangement can also be in a state which does not allow a diagnosis as to whether a differential pressure line is blocked.

According to the invention, it is therefore proposed that the process and/or the differential pressure measurement arrangement be checked before the actual diagnosis as to whether a state which allows a diagnosis is currently present. For this purpose, a set number of differential pressure values, e.g., 100 pressure values, are recorded by the differential pressure measurement arrangement, and a check is subsequently carried out as to whether the differential pressure measurement arrangement and/or the process are in a state which allows a diagnosis of the differential pressure line. In the case where the differential pressure measurement arrangement and/or process are not in a state which allows a diagnosis, the currently recorded measured pressure values are discarded, i.e., deleted and, in particular, not stored.

An advantageous further development of the invention provides that the diagnostics unit be further designed to check whether the differential pressure measurement arrangement is in a stable state, in order to determine whether the differential pressure measurement arrangement is in a state which allows a diagnosis of the differential pressure line.

A further advantageous development of the invention provides that the diagnostics unit be further designed to check whether the process has no significant change, in order to determine whether the process is in a state which allows a diagnosis of the differential pressure line.

The invention further relates to a method for diagnosing a differential pressure line of a differential pressure measurement arrangement, which comprises, according to the invention, at least the following method steps:
a) capturing a set number of first differential pressure values representing a difference between a first media pressure and a second media pressure within a process;
b) checking whether the differential pressure measurement arrangement and/or the process are in a state which allows a diagnosis of the differential pressure line;
c) returning to method step a) in the case where it is determined that the differential pressure measurement arrangement and/or the process are not in a state which allows a diagnosis of the differential pressure line, wherein, in method step a), the differential pressure values are captured anew such that the previously captured first differential pressure values are deleted or overwritten;
d) carrying out a diagnostic function to determine whether a differential pressure line is blocked in the case where it is determined that the differential pressure measurement arrangement and/or the process are in a state which allows a diagnosis of the differential pressure line.

An advantageous embodiment of the method according to the invention provides that, in order to check whether the differential pressure measurement arrangement and/or the process are in a state which allows a diagnosis of the differential pressure line, it at least be checked whether the differential pressure measurement arrangement is in a stable state. In particular, the embodiment may provide that, in order to check whether the differential pressure measurement arrangement is in a stable state, it be checked whether the set number of first differential pressure values are within a defined first range at a predefined frequency. Furthermore, the embodiment may provide for the defined first range to include a simple standard deviation formed of a set number of second differential pressure values. The embodiment may also provide that the set number of second differential pressure values was captured by the differential pressure measurement arrangement while the process is in a stable state and/or that, in the case where the set number of first differential pressure values are not within the defined first range at the predefined frequency, a return be carried out to method step a), wherein, in method step a), the first differential pressure values are captured anew such that the previously captured differential pressure values are preferably completely deleted or overwritten.

A further advantageous embodiment of the method according to the invention provides that, in order to check whether the differential pressure measurement arrangement and/or the process are in a state which allows a diagnosis of the differential pressure line, it at least be checked whether the process has no significant change. In particular, the embodiment may provide that, in order to check whether the process has no significant change, a set number of further differential pressure values be captured, and an average value of the further differential pressure values be formed, wherein it is subsequently checked whether the average value is within a defined second range. In particular, the embodiment may provide that the defined second range be defined by a user or process operator so that the defined second range can be adapted to the conditions of the process. In particular, the embodiment also provides that a triple standard deviation of the previously captured differential pressure values be used as the defined second range if the user or process operator did not predefine a value. In this case, the triple standard deviation has been found to be a suitable compromise between sensitivity and general process noise. In particular, the embodiment may also provide that, in the case where the average value is not within the defined second range, a return be carried out to method step a), wherein, in method step a), a set number of further differential pressure values are captured anew, wherein the previously captured, further differential pressure values are preferably deleted or overwritten, and/or that it be assumed, when carrying out at least the method steps a) through b) for the first time, that the process has no significant change.

BRIEF DESCRIPTION OF THE DRAWINGS

The invention is explained in more detail based upon the following drawings. Shown are.

DETAILED DESCRIPTION

Figure 1:
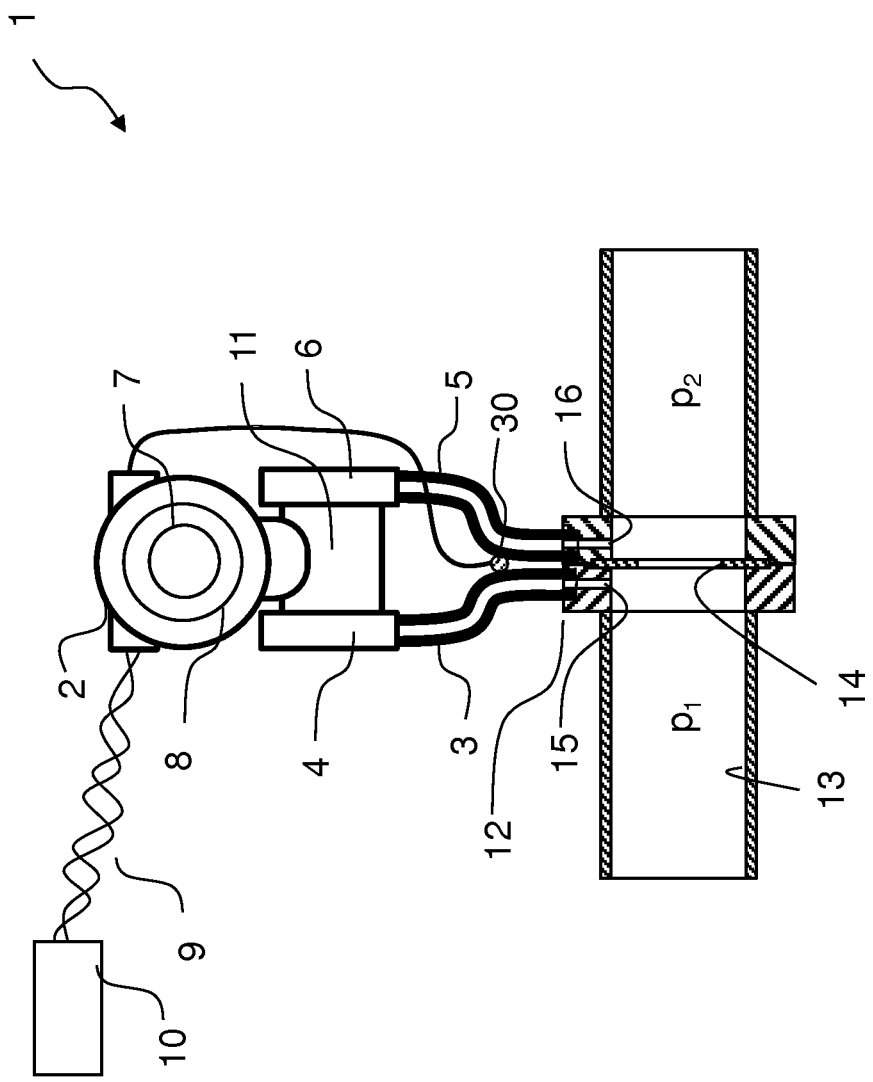
FIG. 1 shows a schematic representation of a differential pressure measurement arrangement according to the invention.

The exemplary embodiment of a differential pressure measurement arrangement 1 according to the invention shown in FIG. 1 comprises a differential pressure transducer 2, which has a sensor module 11 arranged between a first, high-pressure-side pressure inlet 4 and a second, low-pressure-side pressure inlet 6, and an electronics module 8, which is held by the sensor module 11, supplies power to the sensor module 11, and processes signals of the sensor module 11.

The electronics module 8 is connected to a process control system 10 via a two-wire line 9, wherein the electronics module 8 communicates and is supplied with power via the two-wire line 9. The two-wire line 9 can, in particular, be operated as a fieldbus according to the Profibus or Foundation Fieldbus standard or according to the HART standard. Such differential pressure transducers are known per se and are manufactured and marketed, e.g., under the brand name, Deltabar, by the Applicant. The differential pressure measurement arrangement 1 also comprises a differential pressure transducer 12 for installation in a pipeline 13. The differential pressure transducer 12 comprises an orifice 14, a first pressure-tapping channel 15 on a high-pressure side of the orifice 14, and a second pressure-tapping channel 16 on a low-pressure side of the orifice 14. The first high-pressure-side pressure inlet 4 is connected to the high-pressure-side pressure-tapping channel 15 via a first high-pressure-side differential pressure line 3, and the second low-pressure-side pressure inlet 6 is connected to the low-pressure-side pressure-tapping channel 16 via a second low-pressure-side differential pressure line 5. The terms, "high-pressure-side" and "low-pressure-side," refer to a pressure difference, which is caused by a flow (from left to right in the drawing), is proportional to the square of the flow rate, and is, for example, on the order of magnitude of 1 to 10 kPa (10 to 100 mbar). The static pressure on which this flow-dependent pressure difference is superposed can, for example, be 0.1 MPa (1 bar) up to a few 10 MPa (100 bar).

The pressure difference is captured by a sensor element of the sensor module 11, wherein the sensor module 11 outputs a sensor module signal that depends upon the captured pressure difference to the electronics module 8, wherein a processing circuit of the electronics module 8 generates, based upon the sensor module signal, a differential pressure value representing the pressure difference and outputs it to the process control system 10 via the two-wire line 9. Time series of the differential pressure value can be stored in a data memory of the electronics module 8 and/or in the process control system 10. The data memory is designed such that it can store a defined number of differential pressure values. For example, the data memory can be designed such that it can record 100 differential pressure values so that they are kept available for further processing. The data memory is preferably in the form of a ring memory.

Figure 2:
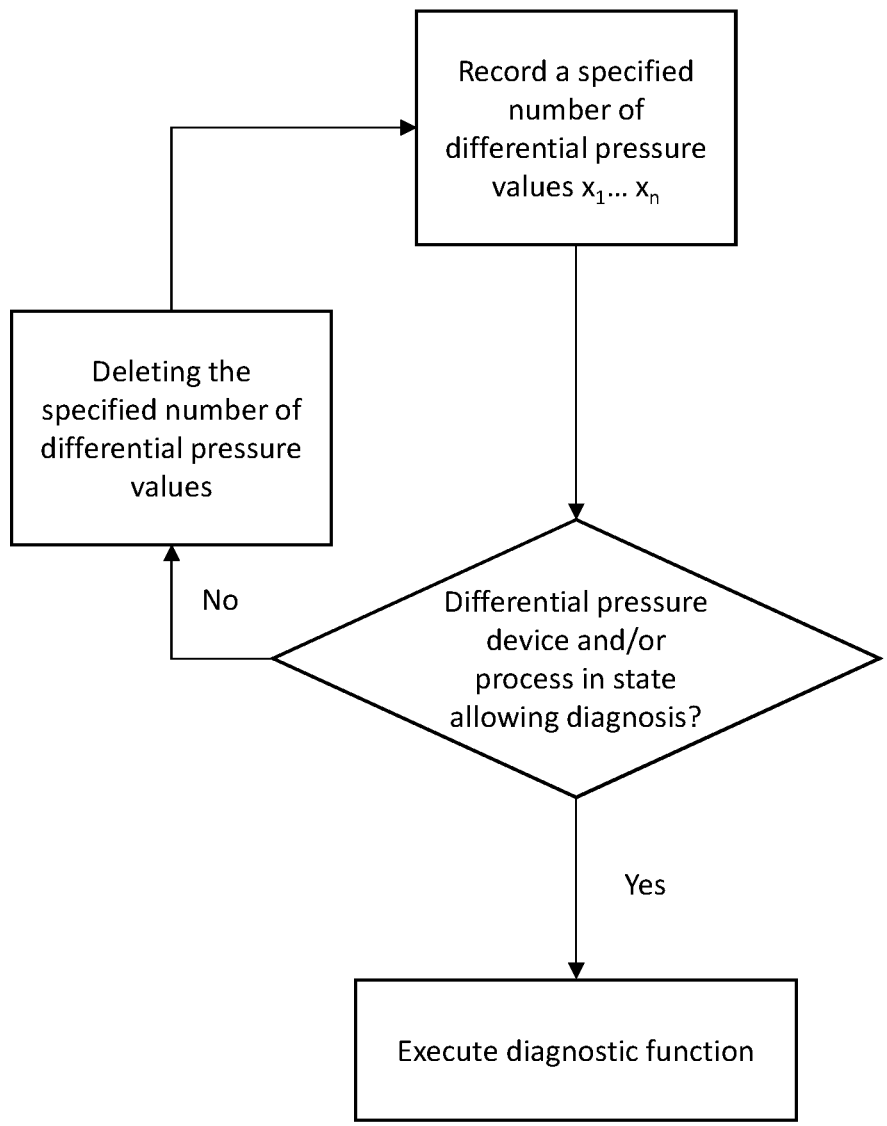
FIG. 2 shows a flow diagram of a method according to the invention.

The differential pressure measurement arrangement 1 further comprises a diagnostics unit 7 designed to carry out the method described below and illustrated in FIG. 2:

In a first method step a), a set number of successive, first differential pressure values $x_1 \ldots x_n$ of the process are recorded and stored in the data memory for further checking. For example, 100 successive, first differential pressure values $x_1 \ldots x_{100}$ can be captured and stored temporarily. The 100 differential pressure values are written successively into the memory—preferably, the ring memory.

In the next method step b), the diagnostics unit checks whether the differential pressure measurement arrangement and/or the process is/are in a state which allows a diagnosis with respect to the blockage of one or possibly both differential pressure lines.

For this purpose, it is first checked whether the differential pressure measurement arrangement is in a stable state. In order to determine whether the differential pressure measurement arrangement is in a stable state, the frequency at which the previously captured, first differential pressure values $x_1 \ldots x_n$ are in a first range $\mu \pm \sigma$ is calculated. In the case where the captured first differential pressure values $x_1 \ldots x_n$ are at a frequency above a predefinable frequency $H_n$ in the first range $\mu \pm \sigma$, it is assumed that the differential pressure measurement arrangement is in a stable state. Both the first range $\mu \pm \sigma$ and the predefined frequency $H_n$ that must be achieved so that a stable state is assumed can, in principle, be selected individually, e.g., by the operator of the differential pressure measurement arrangement.

However, it has been found to be advantageous if the first range $\mu \pm \sigma$ is also determined with the aid of captured differential pressure values of the process. For this purpose, the invention provides for a set number of second differential pressure values $x_{0,1} \ldots x_{0,n}$ to be captured in a stable process, i.e., a state of the process in which it is assumed that unintentional or undesired process changes do not occur. For example, the second differential pressure values $x_{0,1} \ldots x_{0,n}$ can be recorded immediately after the start-up of the differential pressure measurement arrangement. With the aid of the set number of second differential pressure values $x_{0,1} \ldots x_{0,n}$, a simple standard deviation $\sigma(x_{0,1} \ldots x_{0,n})$ can be calculated, and the first range can thus be defined. Preferably, the first range can include the simple standard deviation, such that the first range is $\mu(x_{0,1} \ldots x_{0,n}) \pm \sigma(x_{0,1} \ldots x_{0,n})$. The frequency $H_n$ is preferably predefined to be 68% so that, in this case, the diagnostics unit 7 checks whether the first differential pressure values $x_1 \ldots x_n$, at a frequency $H_n$ of at least 68%, are within the first range of $\mu(x_{0,1} \ldots x_{0,n}) \pm \sigma(x_{0,1} \ldots x_{0,n})$.

In the case where the diagnostics unit 7 determines that the values of the set number of first differential pressure values $x_1 \ldots x_n$ are not within the defined first range at the predefined frequency, the diagnostics unit 7 in method step c) returns to method step a), and the set number of first differential pressure values are completely deleted from the memory so that no historical data regarding the process are stored.

In the case where the diagnostics unit 7 determines that the values of the set number of first differential pressure values $x_1 \ldots x_n$ are within the defined first range at the predefined frequency, the diagnostics unit 7 determines that the differential pressure measurement arrangement is in a state which allows the diagnosis of the differential pressure line or of the differential pressure lines.

In order to diagnose the differential pressure line or lines as to whether blockage is present, the diagnostics unit 7 can use, in method step d), a method known from the prior art, which provides for the determination of the blockage of one or possibly both differential pressure lines. For this purpose, the diagnostics unit can, for example, carry out the method described in the German patent application DE 10 2013 110 059 A1 mentioned at the beginning.

As an alternative or in addition to determining whether the differential pressure measurement arrangement 1 is in a state which allows the diagnosis of the differential pressure line, it can be provided that the diagnostics unit 7 check whether the process has no significant change and thus a diagnosis of the differential pressure lines 3, 5 is also expedient from a process perspective.

For this purpose, the diagnostics unit 7 captures a set number of further differential pressure values $x'_1 \ldots x'_n$ and calculates an average value from the further differential pressure values. Subsequently, the diagnostics unit 7 checks whether the average value $\mu(x'_1 \ldots x'_n)$ is within a defined second range $\mu \pm 3 \cdot \sigma$. This second defined range $\mu \pm 3 \cdot \sigma$ can, for example, be predefined by the operator or user of the differential pressure measurement arrangement. Stored in the diagnostics unit may also be a default value, which is used when the operator or user does not enter a value for the second defined range. It has proven to be particularly advantageous for the default value to be determined from the first differential pressure values $x_1 \ldots x_n$. The second defined range preferably comprises an average value and a triple standard deviation $3 \cdot \sigma$, both of which are formed from the first differential pressure values, so that the second defined range is $\mu(x_1 \ldots x_n) \pm 3 \, \sigma(x_1 \ldots x_n)$.

In the case where the average value $\mu(x'_1 \ldots x'_n)$ of the further differential pressure values $x'_1 \ldots x'_n$ is not within the defined second range $\mu(x_1 \ldots x_n) \pm 3 \, \sigma(x_1 \ldots x_n)$, the diagnostics unit returns to method step a), wherein, in order to determine again whether the process has a significant change, the triple standard deviation $3 \, \sigma(x_1 \ldots x_n)$ of the values of the further differential pressure values $x'_1 \ldots x'_n$ is stored as new default value.

In the case where the average value $\mu(x'_1 \ldots x'_n)$ is within the defined second range $\mu(x_1 \ldots x_n) \pm 3 \, \sigma(x_1 \ldots x_n)$, the diagnostics unit 7 determines that the process has no significant change, such that a diagnosis of differential pressure lines 3, 5 is possible at this time from a process perspective.

The method described above is preferably carried out by the diagnostics unit 7 at regular time intervals during operation of the differential pressure measurement arrangement 1. The time intervals can vary from process to process.

The invention claimed is:

1. A differential pressure measurement arrangement, comprising:
 a differential pressure transducer configured to determine at least one differential pressure value representing a difference between a first media pressure and a second media pressure of a process;

a first differential pressure line connected to a first pressure inlet of the differential pressure transducer such that the first media pressure is applied to the differential pressure transducer;

a second differential pressure line connected to a second pressure inlet of the differential pressure transducer such that the second media pressure is applied to the differential pressure transducer;

a diagnostics unit configured to:

capturing a first set of differential pressure values between the first media pressure and the second media pressure;

determine whether the differential pressure measurement arrangement and/or the process are in a state enabling a diagnosis of the differential pressure line;

when the diagnostics unit determines that the differential pressure measurement arrangement and/or the process are not in a state enabling a diagnosis of the differential pressure line, capturing a new set of differential pressure values, substituting the new set of differential pressure values for the first set of differential pressure values by deleting or overwriting the first set of differential pressure values, and repeating the determination of whether the differential pressure measurement arrangement and/or the process are in a state that enables a diagnosis of the differential pressure line; and when the diagnostics unit determines that the differential pressure measurement arrangement and/or the process are in a state enabling a diagnosis of the differential pressure line, using the first set or the new set of differential pressure values to perform a diagnostic function to determine whether a differential pressure line is blocked, wherein the state enabling a diagnosis of the differential pressure line is defined as when the differential pressure measurement arrangement is in a stable state, wherein the stable state is defined by the first set or the new set of differential pressure values being within a first range at a predefined frequency.

2. The differential pressure measurement arrangement of claim 1, wherein the diagnostics unit is further configured to determine whether the differential pressure measurement arrangement is in the state enabling a diagnosis of the differential pressure line by checking whether the process has undergone a significant change, which is defined as when an average value of a further set of differential pressure values is outside a defined second range.

3. The differential pressure measurement arrangement of claim 2, wherein the second range is defined:

by an operator of the differential pressure measurement arrangement; or as a triple standard deviation from an average value of differential pressure values.

4. A method for diagnosing a differential pressure line of a differential pressure measurement arrangement, the method comprising:

capturing a first set of differential pressure values representing a difference between a first media pressure and a second media pressure of a process;

determining whether the differential pressure measurement arrangement and/or the process are in a state that enables a diagnosis of the differential pressure line;

when the differential pressure measurement arrangement and/or the process are determined to not be in a state that enables a diagnosis of the differential pressure line, capturing a new set of differential pressure values, substituting the new set of differential pressure values for the first set of differential pressure values by deleting or overwriting the first set of differential pressure values, and repeating the determining whether the differential pressure measurement arrangement and/or the process are in a state that enables a diagnosis of the differential pressure line; and when the differential pressure measurement arrangement and/or the process are determined to be in a state that enables a diagnosis of the differential pressure line, using the first set or the new set of differential pressure values to perform a diagnostic function to determine whether a differential pressure line is blocked, wherein the state enabling a diagnosis of the differential pressure line is defined as when the differential pressure measurement arrangement is in a stable state, wherein the stable state is defined by the first set or the new set of differential pressure values being within a first range at a predefined frequency.

5. The method of claim 4, wherein the first range includes a standard deviation of a second set of differential pressure values, the second set of differential pressure values representing the difference between the first media pressure and the second media pressure.

6. The method of claim 5, wherein the second set of differential pressure values is captured by the differential pressure measurement arrangement while the process is in a stable state.

7. The method of claim 4, wherein, the capturing a new set of differential pressure values, and deleting or overwriting the first set of differential pressure values, is performed when the first set of differential pressure values is not within the first range at the predefined frequency.

8. The method of claim 7, wherein the time when the process is known to be in a stable state is when the differential pressure measurement arrangement is initially placed in service.

9. The method of claim 4, wherein checking whether the differential pressure measurement arrangement is in a stable state includes: capturing a second set of differential pressure values representing the difference between the first media pressure and the second media pressure of the process, wherein the second set of differential pressure values is captured before the first set or new set at a time when the process is known to be in a stable state; and checking whether the first set or new set of differential pressure values are within a first range at a predefined frequency, wherein the first range includes a standard deviation of the second set of differential pressure values.

10. The method of claim 4, wherein the determining whether the differential pressure measurement arrangement and/or the process are in a state that enables a diagnosis of the differential pressure line includes checking whether the process has no significant change, which is defined as when an average value of a further set of differential pressure values is outside a defined second range.

11. The method of claim 10, wherein checking whether the process has no significant change includes capturing the further set of differential pressure values, calculating the average value of the further set of differential pressure values, and checking whether the average value is within the second range.

12. The method according to claim 11, wherein the second range is predefined by an operator of the differential pressure measurement arrangement.

13. The method of claim 12, further comprising, when the average value of the further set of differential pressure values is not within the second range, capturing a further new set of differential pressure values, and deleting or overwriting the further set of differential pressure values.

14. The method according to claim 11, wherein the second range includes a triple standard deviation of the first set of differential pressure values.

15. The method of claim 14, further comprising, when the average value of the further set of differential pressure values is not within the second range, capturing a further new set of differential pressure values, and deleting or overwriting the further set of differential pressure values.

16. The method of claim 11, wherein the process is assumed to have no significant change at least when the first set of differential pressure values are initially captured.

* * * * *